United States Patent Office 2,910,406
Patented Oct. 27, 1959

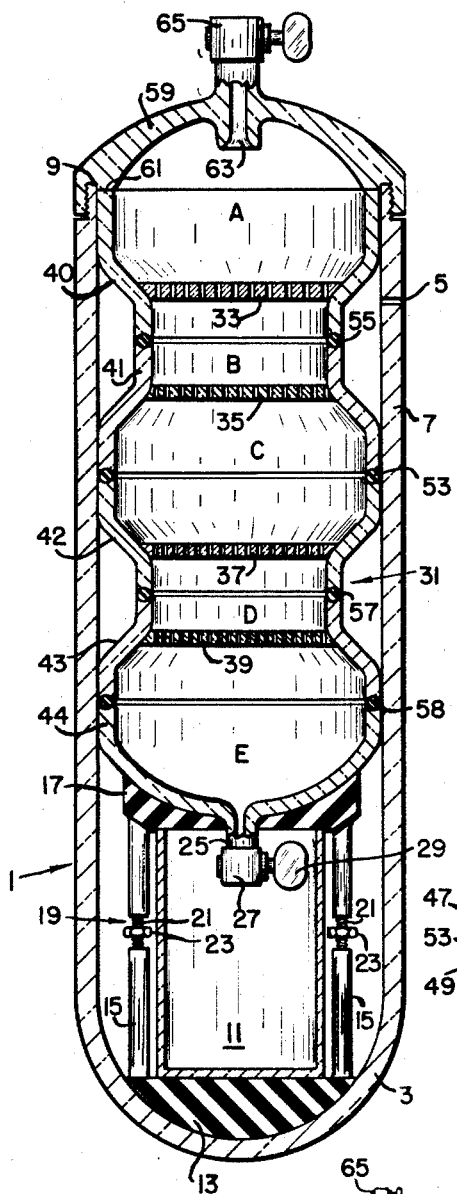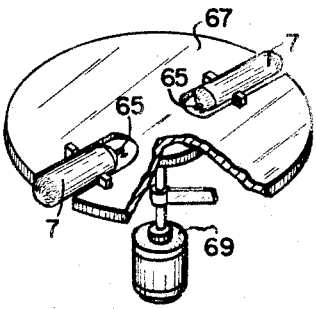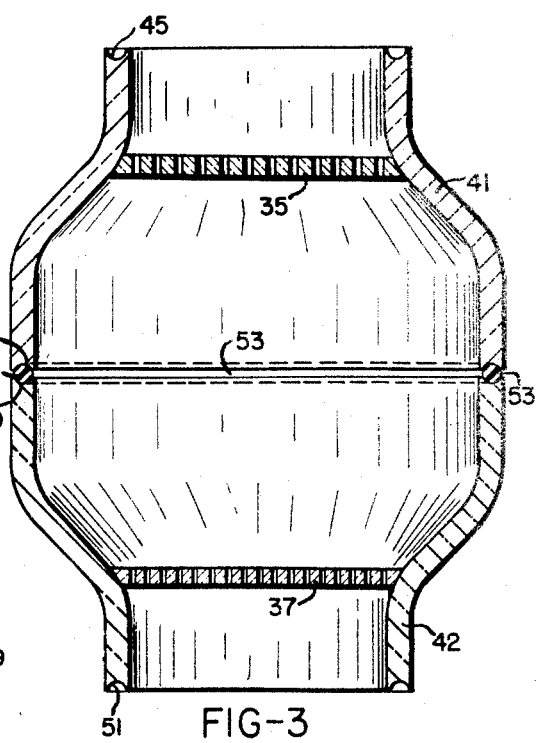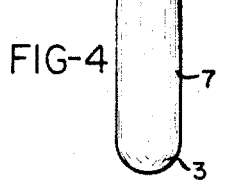
FIG.-1
FIG-2
FIG-3
FIG.-4
INVENTOR.
LEO J. NOVAK
BY Toulmin & Toulmin
ATTORNEYS

2,910,406

METHOD FOR BIOLOGICAL PARTICLE SEPARATION

Leo J. Novak, Dayton, Ohio, assignor to The Commonwealth Engineering Company of Ohio, Dayton, Ohio, a corporation of Ohio Application February 13, 1957, Serial No. 640,054

6 Claims. (Cl. 167—74)

This invention relates to the filtration separation of particles and is particularly concerned with particle mixtures which due to their inherent physical, chemical and bacteriological characteristics must be maintained free of destructive phenomena during the separation process. Still more particularly the invention is directed to the subdividing of mixtures on the basis of particle size and density under conditions of subnormal or low temperatures.

This application is a continuation-in-part of application Serial No. 356,389, filed May 21, 1953, now abandoned, and assigned to the same assignee as the present invention.

Particle size classification on a basis of repetitive filtration of the particles is known and depends upon the flow of a vehicle containing the particles through a filter; thus the moving vehicle causes the particles to contact the filter and to be retained thereby if the filter is sufficiently fine. Such a procedure when employed in conjunction with many materials is disruptive of the structure of the material itself; further the classification of the particles is less precise due to the forces present.

The present invention contemplates achieving particle separation by slowly diffusing a liquid vehicle containing frozen particles through a series of filters which selectively retain the particles thereon in accordance with filter pore and particle size. To occasion diffusibility of the vehicle through the filter or filters the apparatus in the system of invention is subjected to centrifugal force to an extent sufficient to occasion a diffusion rate consistent with the quality of separation desired.

The invention while applicable to many materials has for a primary objective the separation of those particles which above their freezing point are fragile, pliable, delicate or susceptible to destruction by slight physical or chemical changes. Thus biological particles such as cells, mitochondria, unicellular organisms, blood platelets, spermatozoa, food homogenates and biological homogenates are particularly adapted for processing in accordance with the invention. To illustrate, it is frequently desirable in connection with foods to isolate flavor containing particles on a basis of size without affecting the properties of the particles. Also, liver homogenates which are of the biological class may be desirably subjected to the process of invention to achieve particle separation.

A particular object of the invention is to attain separation of viable discrete elements without significant damage to their viability or structure.

The invention has as an important objective the provision of novel apparatus for effecting the separations discussed hereinbefore.

A further objective of the invention is a provision of a system for the practice of the method of invention which system permits the facile, sharp separation of small particles from mixtures.

The invention will be more fully understood by reference to the following detailed description and accompanying drawing wherein:

Figure 1 is an elevational view partially in section of a preferred embodiment of the invention;

Figure 2 illustrates the application of centrifugal force to the structure of Figure 1;

Figure 3 is a sectional view of a portion of the structure of Figure 1; and

Figure 4 is an elevational view of the structure of Figure 1.

Referring to the drawings and particularly Figure 1 the numeral 1 designates a substantially cylindrical member having a closed bottom 3 and an air vent 5 in lateral wall 7. The wall 7 at the upper end is provided with a protuberance 9.

Mounted within the member 1 adjacent the bottom 3 is a receiver 11 supported resiliently on a rubber pad 13. Spaced around the receiver 11 and supported from pad 13 are legs 15 which terminate in a cup-shaped body 17 to define a mounting. The body 17 of the mounting extends across the upper portion of receiver 11. Each leg is bisected at 19 and the opposed sections receive therebetween a threaded bolt 21 having fixed thereon a nut 23 which permits adjustment of the height of body 17. Such adjustment of the height of the mounting is made before insertion into the member 1.

The upper wall of receiver 11 and the body 17 are apertured centrally to receive a conduit 25 carrying at its lower end a valve 27 having stopcock 29.

Supported on the body 17 and extending upwardly from the conduit 25 is a tower or column 31 which fits snugly within the member 1; this fit is preferably such that air, for example, may pass between the mating surfaces of the two elements but is not so loose as to permit of rattling one within the other.

The tower 31 consists of a series of chambers A, B, C, D and E, all but the latter of which are provided with filter plates numbered respectively 33, 35, 37 and 39. These filter plates are preferably of a thin glass fritted to glass walls of the tower and which walls define the chambers, A, B, C, etc. The pore size of the filters may decrease stepwise and as shown in Figure 1 the values may be:

|  | Microns |
|---|---|
| Filter 33 | 40–60 |
| Filter 35 | 10–15 |
| Filter 37 | 4–5½ |
| Filter 39 | .9–1.4 |

While the tower, cylinder 1 and filter plates are suitably of glass as set forth the material of the components is not critical and metal, plastic or impregnated fiber bodies may be employed in particular applications.

As shown most clearly in Figures 1 and 3 sections 40, 41, 42, 43, 44 which form the chambers are retained together in leak-proof relation by rubber gaskets; for this purpose the sections 41, 42, for example, are grooved respectively at 45, 47, 49 and 51 and the gasket 53 is fitted into the grooves 47, 49 to render the sections leak-proof. Pressure is exerted on gasket 53 and the other gaskets 55, 57, 58 by a slight compression of the assembled members between body 17 and cover 59.

The cover 59 is threaded, or otherwise removably secured to the cylindrical member 1; for this purpose the protuberance 9 is screw threaded to receive the threads of cover 59. An internal ledge 61 of cover 59 engages the upper end of section 40 to secure the compressive relation between the sections.

The cover 59 is also provided with an opening 63 for the passage of fluid to the chambers through valve 65; the unit is also adapted, as seen in Figure 2, to be secured to a rotatable table top 67, driven by motor 69 for applying centrifugal force to material within the chambers A, B, C, D, E.

In specific application the apparatus described may be effectively used in the separation of blood cellular elements, for example, when blood has been withdrawn into a sterile container having the usual anticoagulant and when the blood has been centrifuged to separate the plasma from the blood cellular elements, the elements themselves may be separated with the apparatus of invention into various particle sizes. By this means the red cells, which are denser than the larger white cells, may be separated therefrom readily.

To accomplish the separation of blood cellular elements into particles the mixture of the elements is first added to a glycerol-saline solution which preferably contains about 15% glycerol, 0.9% salt, the balance being water. With the blood elements in this solution the temperature of the mixture is reduced to about minus 79° C. which freezes the blood cellular elements solidly in the mass of frozen glycerol-saline material. Adhesion or aggregation of like-frozen particles is minimized and the blood elements assume a rigid form. The elements in this form retain their properties and are not subject to rapid and/or significant decomposition. The mass of frozen material is then raised slowly to a temperature of about minus 5 degrees C. to zero degrees centigrade, which temperature range is sufficient to just liquify the glycerol-saline vehicle while maintaining the cellular elements themselves in the frozen state.

To employ the apparatus of invention, with valve 27 opened very slightly, a second glycerol-saline mixture at a temperature of zero degrees centigrade to minus 5 degrees centigrade is introduced into the apparatus of Figure 1 to completely fill the chambers B, C, D and E. Such a mixture is relatively viscous, like a heavy syrup, and it may be necessary to centrifuge the solution into the chambers. Thereafter the glycerol-saline vehicle containing the frozen blood cellular elements at the controlled temperature of zero to minus 5 degrees centigrade is introduced into the chamber A to fill the space between the filter plate 33 and the top of the system. The assembly is then placed within a chamber having a temperature controlled to zero minus 5 degrees centigrade, which chamber contains the table 67 and the material is then centrifuged.

The centrifuging operation applies a force to the vehicle which permits the same, with valve 27 slightly open, to move slowly through a series of filter plates. The frozen particles will move, due to their density difference as well as due to the centrifugal force, to the filter plates and will be separated on the basis of size at plates 33, 35, 37, 39, etc. The larger white cells of the cellular elements will be retained on the upper plates, while the smaller red cells pass selectively through to the lower plates and to a particular plate depending on size. The blood platelets would be found on the last plate containing the smallest pore size for the sizes hereinbefore specified. It is important to note in connection with the above described operation that the volume of the chamber 11 plus that of chamber E will be conveniently equal to the volume of the other chambers.

Centrifugal speeds of 700-800 G are suitable for the practice of the above noted embodiment of the process of invention.

When the centrifuging operation has been completed cylinder 1 may be removed from the table 67 and the apparatus disassembled; thereafter the cellular particles on each of the filtering surfaces which may retain some occluded or adherent glycerol-saline vehicle are treated by well known techniques, as for example, with isotonic-saline to remove the vehicle. The separated cellular elements may be thus resuspended in, for example, isotonic-saline and maintained at proper physiological temperature and conditions for injection and so forth at a future date.

It is not vital to the operation or to the method of invention that the frozen particles of the blood mixture be subjected to the centrifuging in the glycerol-saline solution in which they are originally frozen. Further other means than centrifugal force may be utilized to pressure the vehicle through the filter plates.

For given circumstances the diffusibility of the vehicle through the various filter plates is important and may be controlled while employing vehicles which will pass the filter plates at a greater or slower rate than that exhibited by the glycerol-saline vehicle.

Thus the frozen liquid particles may be removed from the glycerol-saline vehicle and suspended in glycols, ethyl alcohol or other materials for the centrifuging operation. Such selection of materials also aids separation in given instances, as the density of the vehicle employed in the centrifuging may be chosen to permit of greater or lesser rapidity of separation. Further the vehicle may be selected to render the particle completely rigid and to avoid undue plasticity in the frozen particle.

Glycerol-saline mixtures however are useful as they permit the attainment of the necessary low temperature for the maintaining of the particles rigid while yet having a viscosity which is suitable for accomplishing the objective in a reasonable time when force such as centrifugal force is applied. The following data indicate the character of useful mixtures:

|  | Freezing point, °C. | Density, 20° C. | Viscosity (centipoises at 20° C.) |
| --- | --- | --- | --- |
| 60% glycerol | 34.7 | 1.1533 | 10.96 |
| 66.7% glycerol | 46.5 | 1.17 | 17.0 |
| 70% glycerol | 38.9 | 1.1808 | 22.94 |

It is to be noted that at minus 30 to minus 40° C. the density and viscosity will be materially greater than at 20° C. The density will be above that in substantially all biological cellular elements, and the viscosity will be that of a heavy syrup and substantially molasses-like in most cases. Accordingly a force such as centrifugal force should be utilized in order to facilitate the filtration rate.

It is also to be noted that in some instances cellular or discrete frozen biological elements may have a slightly lesser density than the glycerol-saline mixture employed, that the particles will still be separable for the high viscosity of the vehicle will keep the elements dispersed throughout the vehicle, permitting a uniform filtration. Also, the high viscosity is beneficial as the particles in their movement to the filter plates are effectively cushioned by the vehicle preventing rupture of the elements.

In a further embodiment of the invention wherein platelets of the blood are desired as the sole formed element, the invention may be practiced as follows:

Approximately 500 cc. of human blood are placed in a common glass type centrifuge bottle coated with a non-wettable surface, such as silicon grease or paraffin, and the blood is centrifuged at 4° C. The centrifuge is suitably an International BPV centrifuge operated at 2000-3000 r.p.m. for 15-20 minutes. Such a centrifuge is well known commercially for the purpose.

The plasma is aspirated off from the formed blood elements; to the elements there is then added a volume of glycerine having a temperature of about 4° C. and usually equal in volume to that of the volume of the plasma which has been removed. The blood elements and glycerine may be swirled gently in a bottle and the formed elements completely mixed with the glycerine. The mixture is immediately reduced to a temperature of between zero degrees C. to minus 20 degrees C.

The cold homogeneous mixture is then poured into a larger volume, say 500 cc. of a glycerol-water mixture. Suitably this mixture contains about 66 percent glycerol, 34 percent water, at a temperature of about minus 40° C. After the mixing the total volume is maintained at a temperature of about minus 30° C., the blood elements being in a rigid geometrical form in the viscous liquid phase.

The centrifuge of Figure 1, but suitably having only one filter plate with a pore size of about 3.4 microns, is utilized and the cold viscous mixture is poured onto the plate, and while maintained refrigerated the mixture is centrifuged at a speed to give about 700–800 gravities. Under the influence of the centrifugal force the vehicle and the small size particles pass through the plate, leaving behind thereon all formed elements greater than 3.4 microns; the blood platelets pass through with the viscous vehicle.

The platelets are of importance in blood coagulation studies.

The advantages of the system of invention are particularly notable in connection with the separation of particles which would normally be disrupted in the usual cold filtration processes. Diffusibility of the vehicle and the control of the relationship between the density of the particles and the density of the vehicle afford means for the effective separation by the application of a minimum of force directly to the particles.

It will be understood that this invention is susceptible to modification in order to adapt it to different usages and conditions and accordingly, it is desired to comprehend such modifications within this invention as may fall within the scope of the appended claims.

I claim:

1. In a method of biological particle separation to attain formed biological elements on a basis of size from a mixture of the biological elements and which elements above their freezing point are fragile, pliable and subject to destruction, the steps of introducing a mixture of the formed elements into a liquid vehicle having a freezing point lower than that of the elements, cooling the vehicle with the elements therein to freeze the elements to a rigid geometrical condition, and while the elements are maintained frozen and rigid and surrounded by a viscous vehicle, and filtering the vehicle through apparatus having a series of filter plates of varying pore sizes to effect separation of the elements.

2. In a method of biological particle separation to attain formed biological elements on a basis of size from a mixture of the biological elements and which elements above their freezing point are fragile, pliable and subject to destruction, the steps of introducing a mixture of the formed elements into a liquid vehicle having a freezing point which is lower than that of the elements, cooling the vehicle with the elements therein to freeze the elements to a rigid geometrical condition and to increase the viscosity of the liquid, filtering the vehicle with the frozen elements therein through apparatus having a series of filter plates of varying pore sizes to effect separation of the elements, and filtering the vehicle through the plates under pressure.

3. In a method of biological particle separation to attain formed biological elements on a basis of size from a mixture of the biological elements and which elements above their freezing point are fragile, pliable and subject to destruction, the steps of introducing a mixture of the formed elements into a liquid vehicle having a freezing point which is lower than that of the elements, cooling the vehicle with the elements therein to freeze the elements to a rigid geometrical condition and to increase the viscosity of the liquid, warming the vehicle with the frozen elements therein to decrease the viscosity but maintaining the temperature sufficiently low to maintain the elements frozen and rigid, filtering the vehicle with the frozen elements therein through apparatus having a series of filter plates of varying pore sizes to effect separation of the elements, and filtering the vehicle through the plates under pressure.

4. In a method of biological particle separation to attain formed biological elements on a basis of size from a mixture of the biological elements and which elements above their freezing point are fragile, pliable and subject to destruction, the steps of introducing a mixture of the formed elements into an isotonic liquid vehicle having a freezing point which is lower than that of the elements, cooling the vehicle with the elements therein at least to the vehicle freezing point to freeze the elements solidly in the mass of vehicle and to a rigid geometrical condition, raising the temperature of the vehicle just sufficiently to liquify the isotonic vehicle, filtering the vehicle with the frozen elements therein through apparatus having a series of filter plates of varying pore sizes to effect separation of the elements, and filtering the vehicle through the plates under pressure.

5. In a method of blood particle separation to attain formed blood elements on a basis of size from a mixture of blood elements, the steps of introducing the mixture of formed blood elements into an isotonic liquid vehicle comprising a mixture of glycerine, water and salt and having a freezing point which is lower than that of the elements, cooling the vehicle with the elements therein sufficiently substantially to the vehicle freezing point to freeze the elements to a rigid geometrical condition and to increase the viscosity of the liquid, warming the vehicle while maintaining the elements frozen therein to decrease the viscosity of the vehicle, filtering the vehicle with the frozen elements therein through apparatus having a series of filter plates of varying pore sizes to effect separation of the elements, and filtering the vehicle through the plates under pressure.

6. In a method of blood particle separation to attain formed blood elements on a basis of size from a mixture of blood elements, the steps of introducing the mixture of formed blood elements into an isotonic liquid vehicle comprising approximately 15 percent glycerine, water and salt in solution and having a freezing point which is lower than that of the elements, cooling the vehicle with the elements therein to approximately minus 79° C. to freeze the mass solidly and with the elements therein whereby the elements are frozen to a rigid geometrical condition, warming the vehicle to a temperature of substantially minus 5° C. to liquify the vehicle while maintaining the formed elements frozen to thereby decrease the viscosity of the vehicle to facilitate filtering, filtering the vehicle with the frozen elements therein through a series of filter plates of varying pore size to effect separation of the elements, and filtering the vehicle through the plates under pressure.

References Cited in the file of this patent

UNITED STATES PATENTS

| 813,516 | Pfantz | Feb. 27, 1906 |
| 1,182,465 | Evans | May 9, 1916 |
| 2,281,990 | Parfentjev | May 5, 1942 |
| 2,390,727 | Messet | Dec. 11, 1945 |
| 2,559,204 | Wenzelberger | July 3, 1951 |
| 2,559,205 | Wenzelberger | July 3, 1951 |
| 2,647,059 | Wenzelberger | July 28, 1953 |

OTHER REFERENCES

Tiselius: Nature, Vol 140, No. 3550, Nov. 13, 1937, pp, 848, 849.